United States Patent Office 3,075,649
Patented Jan. 29, 1963

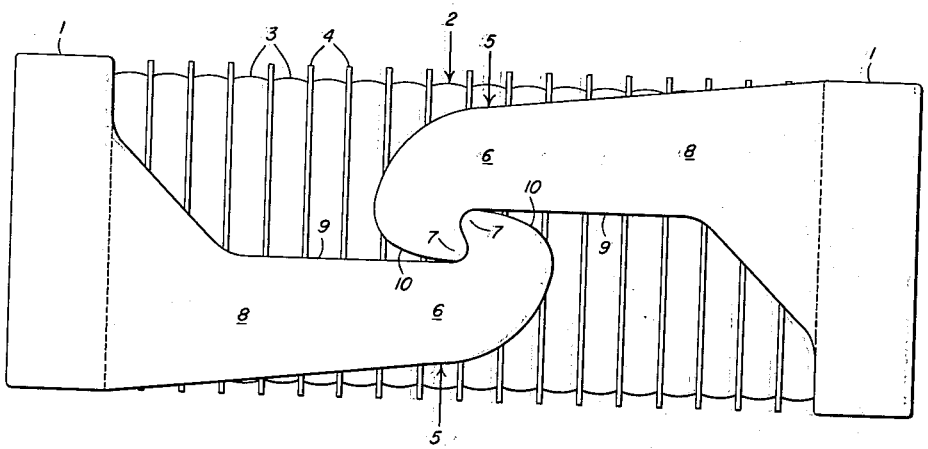
FIG. 1
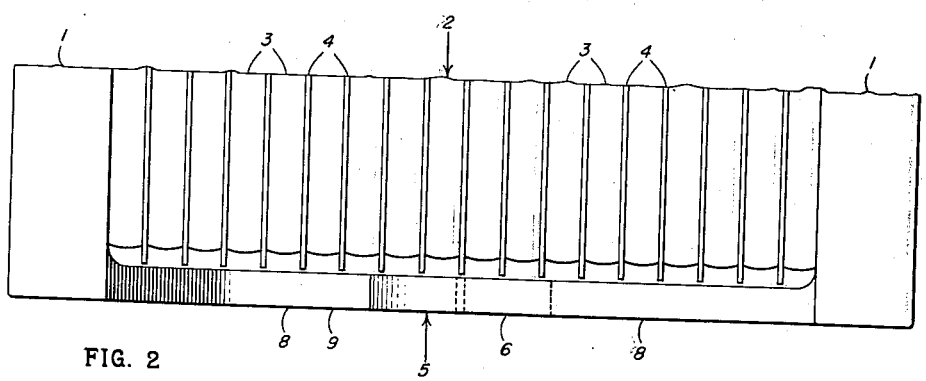
FIG. 2
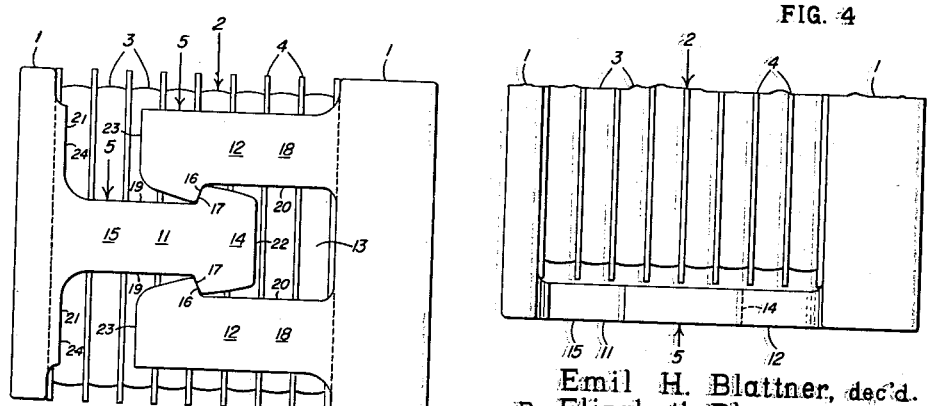
FIG. 3
FIG. 4
Emil H. Blattner, dec'd.
By Elizabeth Blattner, Executrix,
Howard Winther, Inventors.
By *Wilmer Mechlin*
their Attorney.

3,075,649
RUBBER DRAFT GEAR
Emil H. Blattner, deceased, late of Williamsville, N.Y., by Elizabeth Blattner, executrix, Rochester, N.Y., and Howard Winther, Elma, N.Y., assignors to Symington Wayne Corporation, Salisbury, Md., a corporation of Maryland
Filed Feb. 26, 1959, Ser. No. 795,647
12 Claims. (Cl. 213—32)

This invention relates to rubber draft gears for railway vehicles.

Due to the low initial resistance of rubber to compression, it is the common practice in draft gears either depending entirely on rubber for shock absorption or employing one or a plurality of rubber cushions to augment shock absorption, to install the rubber gear or cushion under initial compression, commonly termed "precompression." The usual practice in such case is for the gear manufacturer to compress the rubber of the gear or cushioning unit between associated front and rear follower blocks and, while the rubber is under pressure, connect the follower blocks either by banding or by bolting, so as to hold the rubber under compression when the applied pressure is released and enable the precompressed pads and follower blocks to be installed as a unit in a draft gear pocket in a railway vehicle designed for its accommodation. The difficulty with either expedient is that the connecting means encroaches both laterally and longitudinally upon the available space in the pocket with corresponding reduction in the size and thus capacity of the rubber cushion, the encroachment being serious in either case, but particularly so when the follower blocks are bolted together.

The primary object of the present invention is to provide an improved rubber draft gear unit usable as either a main or an auxiliary draft gear and composed of front and rear follower blocks and an interposed rubber cushion, in which the unit is held in assembled relation with the rubber cushion under precompression by interlocking means carried by and fixed to the follower blocks.

Another object of the invention is to provide an improved rubber draft gear which is installable as a unit with its rubber cushion under precompression by virtue of interlocking means carried by and rigid with its front and rear follower blocks and in which the interlocking means serve, after installation, not only to hold the rubber cushion at all times under precompression, but to limit the maximum compression to which the rubber cushion is subjectable under service forces.

Other objects and advantages of the invention will appear hereinafter in the detailed description, be particularly pointed out in the appended claims and be illustrated in the accompanying drawings, in which:

FIGURE 1 is a side elevational view of an embodiment of the rubber draft gear of the present invention;

FIGURE 2 is a fragmentary plan view of the gear of FIGURE 1;

FIGURE 3 is a side elevational view of another embodiment of the draft gear of the present invention; and FIGURE 4 is a fragmentary plan view of the gear of FIGURE 3.

Referring now in detail to the drawings, in which like reference characters designate like parts, the rubber draft gear or cushioning unit of the present invention is comprised of a pair of front and rear follower or end blocks 1 spaced longitudinally by an interposed rubber cushion 2. While the rubber cushion 2 may take various forms, it generally will be composed of alternating rubber pads 3 and metal plates 4 and, in the form illustrated, is similar to the rubber cushion disclosed in Blattner Patent No. 2,856,078, issued October 14, 1958, in connecting the rubber pads in pairs through intervening plates to form rubber spring units alternating with and spaced by the remaining plates.

In accordance with this invention, pre- or initial compression of the rubber cushion 2, applied at the gear manufacturer's plant by compressing the gear or cushioning unit as a unit by a ram or other suitable means, is held thereafter by interlocking or intercoupling means 5 carried by and rigid with or fixed to the follower blocks 1, the interlocking means also serving to hold the several components of the gear in assembled relation. Both limiting or determining the extent of the expansion of the rubber cushion 2 and permitting its further compression to the extent desired in the particular installation, the interlocking means 5 are essentially two pairs of coupling or hook members, the pairs being at opposite sides of the draft gear, which opposite sides, as appropriate, may be either the gear's top and bottom or its sides proper, and each pair having one member fixed to each of the follower blocks 1 and extending therefrom longitudinally of the draft gear toward the other follower block into intercoupling, interlocking or longitudinally and transversely or laterally overlapping relation with the other member of the pair.

Of the possible variants of which the disclosed embodiments are exemplary, the interlocking members 5 of the embodiment of FIGURES 1 and 2 are hooks 6, the pair of which at opposite sides of each follower block 1 are identical and the counterpart of the pair at the corresponding sides of the other follower block, with the nose 7 of each of the interlocking or mating pair of hooks on the same side of the draft gear extending or projecting toward the shank 8 of its mate. Preferably eccentric and oppositely staggered relative to the sides of the follower blocks 1 from which they project, the hooks 6 of each mating pair preferably have the confronting faces or edges 9 of their shanks 8 substantially parallel to each other and normal or perpendicular to the follower blocks, this preferred parallelism extending from the noses 7 outwardly toward the follower blocks sufficiently to accommodate the noses over the range of compressive movement of the draft gear desired in the particular installation.

Interlocking in the manner shown in FIGURE 1 after the draft gear of that figure is precompressed, the hooks 6 of the first embodiment are designed automatically to interlock as the gear is compressed. This is accomplished by providing each hook with a rounded or bevelled leading edge 10 leading or sloping rearwardly toward its nose 7 and aligning, prior to compression, with the corresponding edge of the mating hook. Sliding along each other as pressure is applied, the leading edges 10 on mating pairs of the hooks 6 tilt or cant the hooks relative to each other and ultimately cam their noses 7 into position to swing or longitudinally and transversely overlapping relation.

In the embodiment of FIGURES 3 and 4, the interlocking or intercoupling members on either side of the draft gear are a male coupling member 11 integral with or fixed to one of the follower blocks 1 and a female coupling member 12 integral with or fixed to the other follower block and having a longitudinally extending slot 13 opening toward the first follower block for receiving a head 14 of the male member, both the male member and the slot in the female member preferably being centered transversely or laterally of the draft gear on their respective follower blocks. Enlarged relative to its shank 15, the head 14 of the male member 11 has at each side an outstanding shoulder or abutment 16 facing rearwardly or outwardly longitudinally of the draft gear toward the connected follower block and engaged, in the precompressed condition of the draft gear shown in FIGURE 3, with a pair of confronting, oppositely facing shoulders or abutments 17 instanding from and each integral or rigid with one of a pair of longitudinally extending, transversely spaced arms 18 straddling the slot 13 and together forming the female member 12.

Overlapping both longitudinally and through their shoulders 16 and 17 transversely or laterally of the draft gear, the intercoupling male and female members 11 and 12 in effect act as hooks, the male member as a double hook and the female member as a pair of single hooks, the latter embracing and interlocking or intercoupling with the former in the precompressed condition of the draft gear. The sides 19 of the shank 15 of the male member 11 and the confronting sides or faces 20 of the arms 18 of the female member 12 preferably are substantially parallel and normal to their respective follower blocks 1 and are of sufficient length to accommodate the range of compressive movement desired in the draft gear under service conditions.

Equally spaced initially from the confronting of the follower blocks 1 or, in the case of the female member 12, preferably flat-faced ledges or abutments 21 on and forming part of the confronting block at either side of the male member 11, the inner or free ends 22 and 23, respectively, of the head 14 of the male member and arms 18 of the female member are utilized in this embodiment to limit the maximum compression of the rubber cushion 2 under service forces. For this purpose, the ends 22 and 23 of the members 11 and 12, along with the confronting surfaces 24 on the ledges 21 and on the female member carrying follower block at the outer end of the slot 13, preferably are flattened in planes extending transversely of the draft gear.

Unlike the hooks 6 of the first embodiment, the intercoupling male and female members 11 and 12 of this embodiment will not automatically couple on application of the pressure by which the draft gear is precompressed, the pair of male members 11 carried by one of the follower blocks 1 and the pair of female members 12 carried by the other follower block being interfittable or intercouplable only on relative lateral shifting of the follower blocks. It therefore is necessary in this embodiment that the members 11 and 12 be intercoupled before insertion of the rubber cushion 2 and that the latter then be inserted from one or the other of the sides of the draft gear not blocked by the intercoupling members, such insertion being facilitated by compressing the rubber cushion during insertion by suitable clamping means and tilting the follower blocks relative to each other so as to increase temporarily the longitudinal extent of the side through which the rubber cushion is inserted.

With the hooks 6 of the first embodiment and the male and female members 11 and 12 of the second embodiment preferably flat and within the transverse confines of the follower blocks 1 and those at the same side substantially coplanar and at opposite sides substantially parallel, the intercoupling members 5 of either embodiment encroach at minimum on the transverse dimension available for the rubber cushion 2 in the pocket (not shown) in which it is designed to be accommodated and not at all on the pocket's longitudinal dimension. Held in assembled relation and precompressed condition by their coupling member 5, the draft gears of both embodiments, if desired to facilitate installation, can be further compressed at the manufacturer's plant and temporarily held under such precompression by compressing either gear with its rubber cushion 2 interposed between its follower blocks 1 beyond the point at which its coupling members engage and inserting temporarily filler blocks (not shown) of wood or other suitable material between the then-separated engageable surfaces of their coupling members, the noses 7 of the hooks 6 of the first embodiment and the shoulders 16 and 17 of the members 11 and 12 of the second embodiment. If used, such temporary filler blocks will drop out or disintegrate on a few closures under service forces, thereafter enabling the rubber cushion to expand to the limit permitted by the coupling members.

From the above detailed description, it will be apparent that there has been provided an improved rubber draft gear incorporating permanent means for holding its rubber cushion under precompression, the means being both effective and encroaching at minimum on the space available for the rubber cushion. It should be understood that the described and disclosed embodiments are merely exemplary of the invention and that all modifications are intended to be included which do not depart from either the spirit of the invention or the scope of the appended claims.

Having described our invention, we claim:

1. An open-sided rubber draft gear comprising a pair of follower blocks, a rubber cushion interposed between and longitudinally spacing said follower blocks, a pair of transversely spaced coupling members projecting from correspondingly opposite sides of each of said follower blocks toward the other follower block and each intercoupling with a coupling member on the same side of the other follower block for limiting expansion of said rubber cushion while permitting compression thereof, and surfaces on said coupling members and engageable with confronting surfaces on said follower blocks for limiting said compression.

2. A rubber draft gear comprising a pair of follower blocks, a rubber cushion interposed between and longitudinally spacing said follower blocks, a pair of male members fixed to and at opposite sides of one of said follower blocks and projecting therefrom toward said other follower block, a pair of female members fixed to and projecting from corresponding sides of the other follower block toward said one follower block, said female members each including a pair of arms straddling a slot slidably receiving an enlarged head of a male member on the same side of said draft gear, and shoulder means on each of said heads and longitudinally and transversely overlapping and being engageable with shoulder means on the arms straddling the slot in which said head is received for limiting expansion of said rubber cushion.

3. A rubber draft gear comprising a pair of follower blocks, a rubber cushion interposed between and longitudinally spacing said follower blocks, a pair of male members fixed to and at opposite sides of one of said follower blocks and projecting therefrom toward said other follower block, a pair of female members fixed to and projecting from corresponding sides of the other follower block toward said one follower block, said female members each including a pair of arms straddling a slot slidably receiving an enlarged head of a male member on the same side of said draft gear, shoulder means on each of said heads and longitudinally and transversely overlapping and being engageable with shoulder means on the arms straddling the slot in which said head is received for limiting expansion of said rubber cushion while permitting compression thereof, and end surfaces on said heads and arms and each confronting and engageable with a surface on one of said follower blocks for limiting said compression.

4. In an open-sided rubber draft gear having a rubber cushion, the improvement comprising a follower block positionable at one end of said rubber cushion, and transversely spaced coupling means rigid with and projecting from a cushion-confrontable face of said follower block and coupleable with coupling means rigid with a follower block positioned at the opposite end of said rubber cushion for limiting expansion thereof.

5. An open-sided rubber draft gear comprising a pair of follower blocks, a rubber cushion interposed between and longitudinally spacing said follower blocks and open at sides therebetween, and transversely spaced rigid means fixed to one of said follower blocks and projecting therefrom along said rubber cushion and coupling with transversely spaced fixed means fixed to and projecting from the other follower block for holding said gear in assembled relation and said rubber cushion under precompression.

6. An open-sided rubber draft gear comprising a pair of follower blocks, a rubber cushion interposed between and longitudinally spacing said follower blocks and open at sides therebetween, and transversely spaced rigid means fixed to and projecting longitudinally from each of said follower blocks along said rubber cushion and intercoupling on compression thereof intermediate longitudinal extremities of said rubber cushion for holding said gear in assembled relation and said rubber cushion under precompression.

7. An open-sided rubber draft gear comprising a pair of follower blocks, a rubber cushion interposed between and longitudinally spacing said follower blocks and open at sides therebetween, and transversely spaced rigid coupling means fixed to each of said follower blocks and extending along and embracing opposite sides of said rubber cushion, said coupling means intercoupling between said follower blocks for limiting expansion of said rubber cushion.

8. An open-sided rubber draft gear comprising a pair of follower blocks, a rubber cushion interposed between and longitudinally spacing said follower blocks, and a pair of transversely spaced coupling members rigid with and projecting from one of said follower blocks along opposite sides of said rubber cushion and each intercoupling with one of a pair of transversely spaced coupling members rigid with and projecting correspondingly from the other follower block for limiting expansion of said rubber cushion.

9. An open-sided rubber draft gear comprising a pair of follower blocks, a rubber cushion interposed between and longitudinally spacing said follower blocks, and a pair of transversely spaced coupling members rigid with and projecting from one of said follower blocks along opposite sides of said rubber cushion and each longitudinally and transversely overlapping one of a pair of transversely spaced coupling members rigid with and projecting correspondingly from the other follower block for limiting expansion of said rubber cushion.

10. An open-sided rubber draft gear comprising a pair of follower blocks, a rubber cushion interposed between and longitudinally spacing said follower blocks, and a pair of transversely spaced hooks rigid with and projecting from one of said follower blocks along opposite sides of said rubber cushion and each intercoupling with one of a pair of transversely spaced hooks rigid with and projecting correspondingly from the other follower block for limiting expansion of said rubber cushion.

11. A rubber draft gear comprising a pair of follower blocks, a rubber cushion interposed between and longitudinally spacing said follower blocks, a pair of hooks rigid with and projecting from one of said follower blocks along opposite sides of said rubber cushion and each intercoupling with one of a pair of hooks projecting correspondingly from the other follower block for limiting expansion of said rubber cushion, and end surfaces on intercoupling hooks and slidably engageable on compression of said draft gear for automatically intercoupling said hooks during such compression.

12. In an open-sided rubber draft gear having a pair of follower blocks and a rubber cushion interposed between and longitudinally spacing said follower blocks, the improvement comprising transversely spaced coupling members rigid with and projecting from each of said follower blocks toward the other follower block and intercoupleable for limiting expansion of said rubber cushion while permitting compression thereof.

References Cited in the file of this patent

UNITED STATES PATENTS

| | | |
|---|---|---|
| 1,546,710 | Bowditch | July 21, 1925 |
| 1,876,019 | Priebe | Sept. 6, 1932 |
| 2,530,072 | O'Connor | Nov. 14, 1950 |
| 2,598,762 | Dath | June 3, 1952 |
| 2,641,463 | Mulcahy | June 9, 1953 |
| 2,789,811 | Campbell | Apr. 23, 1957 |
| 2,880,886 | Mulcahy | Apr. 7, 1959 |
| 2,887,770 | Spence | May 26, 1959 |
| 2,897,981 | Blattner | Aug. 4, 1959 |